United States Patent
Eckstein et al.

(10) Patent No.: US 9,254,859 B2
(45) Date of Patent: Feb. 9, 2016

(54) MOTOR VEHICLE STEERING WHEEL HAVING OPERATING ELEMENTS AND METHOD OF OPERATING SAME

(75) Inventors: Lutz Eckstein, Starnberg (DE); Dietmar Fuchs, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1083 days.

(21) Appl. No.: 12/487,977

(22) Filed: Jun. 19, 2009

(65) Prior Publication Data

US 2010/0250066 A1    Sep. 30, 2010

Related U.S. Application Data

(63) Continuation of application No. PCT/EP2007/010979, filed on Dec. 14, 2007.

(30) Foreign Application Priority Data

Dec. 21, 2006  (DE) .......................... 10 2006 060 554

(51) Int. Cl.
*B63G 8/20*     (2006.01)
*B62D 1/04*     (2006.01)
(Continued)

(52) U.S. Cl.
CPC .............. *B62D 1/046* (2013.01); *B60K 31/042* (2013.01); *B60W 30/143* (2013.01); *B60K 2310/20* (2013.01); *B60K 2350/928* (2013.01); *B60W 2540/04* (2013.01)

(58) Field of Classification Search
CPC ..................... B60K 2310/20; B60K 2350/928; B60K 31/042; B60W 2540/04; B60W 30/143; B62D 1/046

USPC ........... 701/37, 52, 70, 93, 49, 94, 96, 36, 91, 701/41
See application file for complete search history.

(56) References Cited

U.S. PATENT DOCUMENTS 5,089,965 A * 2/1992 Braun ............................. 701/52
5,096,015 A * 3/1992 Akishino et al. .............. 180/179
(Continued)

FOREIGN PATENT DOCUMENTS

DE    195 09 494 A1   9/1996
DE    195 48 659 C1   5/1997
(Continued)

OTHER PUBLICATIONS

International Search Report dated Apr. 24, 2008 (Two (2) pages).
(Continued)

*Primary Examiner* — Thomas G Black
*Assistant Examiner* — Sze-Hon Kong
(74) *Attorney, Agent, or Firm* — Crowell & Moring LLP

(57) ABSTRACT

A steering wheel for a motor vehicle has operating elements for controlling at least one longitudinally dynamic control system of the motor vehicle. The operating elements include an adjusting element for changing a set speed value for the longitudinally dynamic control system, which adjusting element can be actuated in two opposite actuating directions in order to predefine a direction of the change of the set speed value by way of the actuating direction. The adjusting element can be actuated in at least two steps in each of the two actuating directions with respect to the extent of the actuation in order to predefine an extent of the change of the set speed value by way of the extent of the actuation.

20 Claims, 1 Drawing Sheet

(51) Int. Cl.
  *B60K 31/04* (2006.01)
  *B60W 30/14* (2006.01)

(56) References Cited

U.S. PATENT DOCUMENTS

| | | | | |
|---|---|---|---|---|
| 5,191,971 | A | * | 3/1993 | Hakkarainen et al. ........ 200/550 |
| 5,264,669 | A | * | 11/1993 | Merten ........................ 200/11 K |
| 5,477,457 | A | * | 12/1995 | Okada ............................... 701/37 |
| 5,486,669 | A | * | 1/1996 | Oshgan ........................... 200/556 |
| 5,567,992 | A | * | 10/1996 | Grahn et al. .................. 307/10.1 |
| 5,713,428 | A | | 2/1998 | Linden et al. |
| 5,749,426 | A | * | 5/1998 | Gilling .......................... 180/167 |
| 5,808,374 | A | * | 9/1998 | Miller et al. ................. 307/10.1 |
| 5,957,992 | A | * | 9/1999 | Kiyono ............................ 701/93 |
| 6,198,175 | B1 | | 3/2001 | Kalb et al. |
| 6,246,129 | B1 | * | 6/2001 | Schaefer ...................... 307/10.1 |
| 6,282,482 | B1 | * | 8/2001 | Hedstrom ....................... 701/93 |
| 6,360,158 | B1 | * | 3/2002 | Hanawa et al. ................. 701/93 |
| 6,373,400 | B1 | * | 4/2002 | Fujita et al. ................... 340/901 |
| 6,470,257 | B1 | * | 10/2002 | Seto ................................. 701/96 |
| 6,586,692 | B2 | * | 7/2003 | Agetsuma .................. 200/61.54 |
| 6,704,637 | B1 | * | 3/2004 | Hrazdera et al. ................ 701/93 |
| 6,810,319 | B2 | * | 10/2004 | Manaka ........................... 701/96 |
| 6,865,471 | B2 | * | 3/2005 | Konishi et al. .................. 701/93 |
| 6,902,021 | B2 | * | 6/2005 | Kikuchi et al. ............... 180/170 |
| 6,903,288 | B2 | * | 6/2005 | Varga ............................. 200/200 |
| 7,113,859 | B2 | * | 9/2006 | Hellmann et al. .............. 701/93 |
| 7,194,352 | B2 | * | 3/2007 | Muehlbauer et al. ........... 701/93 |
| 7,257,478 | B2 | * | 8/2007 | Sugano ............................ 701/96 |
| 7,460,945 | B2 | * | 12/2008 | Boecker et al. ................. 701/93 |
| 7,460,946 | B2 | * | 12/2008 | Shima ............................. 701/96 |
| 7,477,979 | B2 | * | 1/2009 | Arai et al. ....................... 701/96 |
| 7,743,866 | B2 | * | 6/2010 | Proemm ........................ 180/170 |
| 2002/0003055 | A1 | * | 1/2002 | Leitner et al. ................. 180/170 |
| 2002/0133285 | A1 | * | 9/2002 | Hirasago ......................... 701/96 |
| 2003/0010152 | A1 | * | 1/2003 | Evans et al. .................. 74/730.1 |
| 2003/0209376 | A1 | | 11/2003 | Kustosch et al. |
| 2004/0225430 | A1 | * | 11/2004 | Bothe et al. ..................... 701/52 |
| 2005/0055150 | A1 | * | 3/2005 | Uhler et al. ..................... 701/93 |
| 2005/0131614 | A1 | * | 6/2005 | Isogai et al. .................... 701/93 |
| 2006/0015240 | A1 | * | 1/2006 | Shima ............................. 701/93 |
| 2006/0212207 | A1 | * | 9/2006 | Sugano et al. .................. 701/93 |
| 2006/0265115 | A1 | * | 11/2006 | Etori et al. ...................... 701/96 |
| 2007/0021898 | A1 | * | 1/2007 | Proemm ......................... 701/93 |
| 2007/0078041 | A1 | * | 4/2007 | Nishi et al. .................... 477/115 |
| 2008/0190681 | A1 | | 8/2008 | Mayser et al. |
| 2008/0243351 | A1 | * | 10/2008 | Isogai et al. .................... 701/96 |

FOREIGN PATENT DOCUMENTS

| | | |
|---|---|---|
| DE | 102 19 800 A1 | 11/2003 |
| DE | 10 2005 012 715 A1 | 5/2006 |
| DE | 10 2005 036 923 A1 | 2/2007 |
| DE | 10 2006 002 059 A1 | 7/2007 |
| EP | 0 876 936 A1 | 11/1998 |
| EP | 1 129 885 A2 | 9/2001 |
| JP | 58-96142 A | 6/1983 |

OTHER PUBLICATIONS

German Search Report dated Dec. 6, 2007 including partial English translation (Nine (9) pages).

* cited by examiner

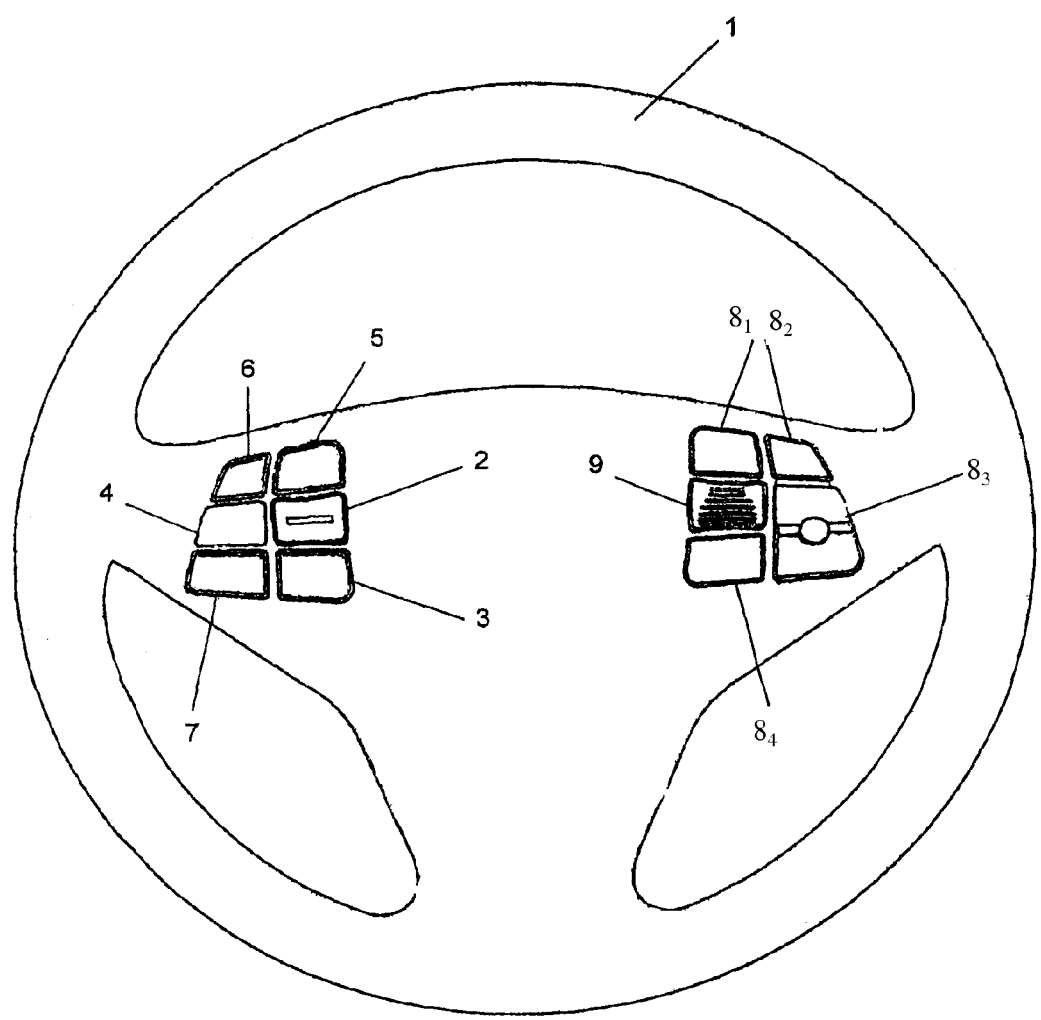

MOTOR VEHICLE STEERING WHEEL HAVING OPERATING ELEMENTS AND METHOD OF OPERATING SAME

CROSS-REFERENCE TO RELATED APPLICATIONS

This application is a continuation of PCT International Application No. PCT/EP2007/010979, filed Dec. 14, 2007, which claims priority under 35 U.S.C. §119 to German Patent Application No. 10 2006 060 554.3, filed Dec. 21, 2006, the entire disclosures of which are herein expressly incorporated by reference.

BACKGROUND AND SUMMARY OF THE INVENTION

The invention relates to a steering wheel for a motor vehicle having operating elements for controlling at least one longitudinally dynamic control system of the motor vehicle, and a method of operating same.

In addition, the invention relates to a motor vehicle having such a steering wheel.

Longitudinally dynamic control systems are increasingly used in modern motor vehicles. For example, pure cruise control systems, cruise control systems with a braking function, longitudinal cruise control systems (such as ACC—adaptive cruise control) and speed limiting systems are known.

Typically, either operating elements on the steering wheel of the motor vehicle or steering column switches are provided for operating such longitudinally dynamic control systems. However, the known operating concepts still have various disadvantages. For example, a steering gear arm, which is provided for operating a longitudinally dynamic control system, may be confused with another steering gear arm (such as a turn signal lever or a wiper lever). This applies particularly when no marking or other identification of the steering gear arm is provided and/or when this marking or other identification cannot be seen from the driver's viewing direction, for example due to obstructions or a lack of illumination. Because of the limited space available on the steering wheel, as well as for aesthetic and ergonomic reasons, as a rule, only a few operating elements for operating longitudinally dynamic control systems are arranged on a steering wheel. As a rule, the extent of the operating commands that can be generated by actuating these operating elements is therefore narrowly restricted.

It is an object of the invention to create a steering wheel for a motor vehicle having operating elements, and a method of operating same, by which an improved operation of a longitudinally dynamic control system becomes possible.

Furthermore, it is an object of the invention to provide a motor vehicle having a steering wheel which has operating elements by which an improved operation of a longitudinally dynamic control system becomes possible.

According to the invention, operating elements for controlling at least one longitudinally dynamic control system of the motor vehicle are arranged on a steering wheel for a motor vehicle. These operating elements include an adjusting element for changing a set speed value for the at least one longitudinally dynamic control system. The adjusting element can be actuated into two opposite actuation directions in order to predefine a direction of the change of the set speed value by means of the actuation direction. Particularly, by means of rotating or displacing in a first direction, the set speed value can be increased, while it is reduced in the opposite direction. In addition, with respect to the extent of the actuation, the adjusting element can be actuated in at least two steps in each of the two actuating directions. The adjusting element, for example, be constructed such that it can be displaced or rotated in every direction beyond a first pressure point perceptible to the actuating driver up to a second perceptible pressure point, which advantageously can simultaneously be implemented as a mechanical stop. According to the invention, the operating characteristic, which, with respect to the actuation, has several steps, particularly two steps, for each of the two actuating directions, has the purpose of predefining an extent of the change of the set speed value commanded by the actuation of the adjusting element.

In the case of a suitable construction, such an adjusting element takes up little space at the steering wheel but, with respect to the prior art, expands the variety of operating commands available by way of the actuating of steering wheel operating elements. By providing a single operating element, the driver can be given the opportunity to generate a large number of operating commands.

The operator intuitively understands the possibility of actuating in two opposite directions according to the invention as a possibility of increasing and reducing the set speed. Likewise, the multi-step capability of actuating in each direction is intuitively understood such that a "higher" step of the actuation results in a "stronger" reaction. This effect can still be intensified when the operator experiences a suitable haptic acknowledgment during the actuation. For example, for reaching a "higher" step, the overcoming of a pressure point or engagement point may be required, or there may be the necessity of applying an especially forceful contact pressure. Such a haptic acknowledgement can also be actively generated by an actuator assigned to the adjusting element. Thus, the required contact pressure force or the perceptibility of a pressure point can be varied as a function of the situation (for example, as a function of the current driving speed). Special haptic effects (for example, vibration of the adjusting element) can also be presented in order to output additional information to the driver; for example, in order to draw his attention to a safety risk connected with the reaction of the motor vehicle to an actuating of the adjusting element to a certain extent.

The extent of the change of the set speed can be appropriately assigned to the steps of the extent of the actuation. For example, the actuation to a first low extent (for example, actuation only to a first perceptible pressure point without exceeding the latter) can be used for increasing or decreasing the set speed by 1 km/h or 1 mph, while the actuation to a second higher extent (for example, exceeding of the above-mentioned first perceptible pressure point and further actuation up to a second perceptible pressure point) can be used for increasing or reducing the set speed by 10 km/h or 10 mph.

Instead of the above-mentioned one-unit and ten-unit steps, naturally any other step ranges can also be predefined. In the case of a greater extent of the actuation, a greater change of the set speed would be advantageous.

Instead of only two steps of the extent of the actuation, as described above, there may naturally be a differentiation between even more steps. For example, steps of the extents of 1 km/h, 5 km/h and 10 km/h may be used in the case of a three-step characteristic in one or even both actuating directions.

A function of the extent of the actuation of the adjusting element, the controller adjustments may be changed, particularly the controller intensification, of the longitudinally dynamic control system, to which the changed set speed relates. Thus, it can, for example, be achieved that, in the case of an actuation to the extent of a first step, the controlling to the changed set speed takes place slowly or softly, while, in the case of an actuation to the extent of a second step, the controlling to the changed set speed takes place in a rapid or stiff manner. As a result, depending on the extent of the actuation, the driver can optionally predefine a more comfortable or a more sporty acceleration or deceleration behavior of the motor vehicle. In particular, a changed, especially a stiffer, controller adjustment of the longitudinally dynamic control system can be assigned to the highest step of the extent of the actuation. Thus, for example, in the case of a two-step actuation characteristic of the adjusting element, the first step may be used for a slight speed change (for example, by 1 km/h) while the controller adjustment is "soft", whereas the second step is used for a greater speed change (for example, by 10 km/h) while the controller adjustment is "stiff". When the driver desires a large speed change while the controller adjustment is "soft", he can also give this type of a command in that he actuates the adjusting element several times or for a prolonged time.

It may be particularly advantageous for different adjustments with respect to the use of the brakes of the motor vehicle to be assigned to at least two differentiable steps of the extent of the actuation. In view of the deceleration of the vehicle, the operating logic can then advantageously be constructed such that an actuation to the extent of a first step only has the result that the vehicle slowly reduces its speed exclusively on the basis of friction and aerodynamic drag but without any active braking intervention, whereas an actuation to the extent of a second step results in an active braking intervention of the vehicle in order to reduce the speed of the vehicle even faster than during the actuation to the extent of the first step. The intuitive operability also and, in particular, exists in the case of such an implementation of the invention because the driver expects that a "stronger" vehicle reaction follows an actuation to a "higher" extent, which is provided by the active braking intervention.

An expanded operability of the longitudinally dynamic control system of the motor vehicle can be achieved particularly in the case of at least a three-step actuation characteristic of the adjusting element. Then, for example, the first step can be used for a slight speed change (for example, by 1 km/h) while the controller adjustment is "soft"; the second step can be used for a larger speed change (for example, by 10 km/h) while the controller adjustment is also "soft"; and the third step can be used for a speed change whose extent is equal to the extent of the speed change of the second step, which, however, is implemented when the controller adjustment is "stiff" and thereby with more sporty driving dynamics. In this example, the extent of the speed change of the third step, for example, is selected to be equal to the extent of the speed change of the second step. This is particularly advantageous because then a transition from the second to the third step can be consciously carried out by the driver as an operating action exclusively aimed at a change of the driving dynamics. However, in principle, an assignment of another extent of the speed change to the third step is also conceivable, which other extent differs from that of the second step, and, in particularly, is larger (for example, 20 km/h).

The operating elements are preferably arranged inside the steering wheel rim of the steering wheel. This arrangement was also found to be successful in systems known from the prior art. Particularly when the operating elements are arranged close to the steering wheel rim on a spoke of the steering wheel, the driver can comfortably operate them with his thumb during the drive without have to let go of the steering wheel rim. For a comfortable actuating by means of the driver's thumb, the adjusting element is preferably constructed and arranged on the steering wheel such that an actuation can essentially take place in a translatory fashion and in a direction essentially parallel to the steering wheel rim. If the adjusting element is arranged, for example, in a "3 o'clock" position or in a "9 o'clock" position on the steering wheel, this indicates essentially an upward and a downward actuation. The driver intuitively associates an actuation in such a direction with an acceleration (upward actuation) or a deceleration (downward actuation) of the vehicle.

The adjusting element may optionally be constructed such that it permits a rotatory or a translatory actuation in opposite actuating directions. The above-mentioned opposite actuating direction of the adjusting element may therefore be opposite displacing directions or opposite rotating directions.

The implementation of the adjusting element as a rotary rocker which is, in each case, constructed in several steps in two rotating directions appears particularly advantageous. The above-described characteristics of the invention can be implemented in a simple, cost-effective and compact manner by use of such a rotary rocker.

Embodiments of the invention which, for each actuating direction, require the differentiation of maximally two steps of the extent of the actuation can be implemented particularly easily, cost-effectively and compactly in accordance with the invention by way of a rotary rocker as the adjusting element which is in each case constructed in two steps in two rotating directions.

According to an advantageous further development, the operating elements provided at the steering wheel include at least one preselection element constructed separately from the adjusting element for preselecting one of several longitudinally dynamic control systems of the motor vehicle.

The preselection element may, for example, be constructed in a very simple fashion as a push button or push key. This further development permits a particularly good utilization of the other operating elements on the steering wheel, to the extent that they relate to the operation of typical functions of longitudinally dynamic control systems. In particular, this further development permits a particularly good utilization of a multi-step adjusting element of the above-described type.

The providing of such a preselection element is based on the consideration that the operation of different longitudinally dynamic control systems (such as ACC and conventional cruise control) essentially implies similar or partly even the same operating commands. For example, typically a set speed is adjusted for both systems. According to the present further development, the same operating elements are now used for comparable operating commands, which address different longitudinally dynamic control systems—particularly the same adjusting element which is constructed bidirectionally and in several steps according to the invention. The preselection element additionally provided according to the present further development permits the operator to determine to which longitudinally dynamic control system his operating commands relate.

The adjusting element and the other operating elements respectively can therefore be used for operating all longitudinally dynamic control systems of the vehicle that can be preselected by the preselection element and do not have to be provided separately for each individual longitudinally dynamic control system. In addition, the operation by the driver can take place more intuitively if he always uses the same operating elements for similar operating actions and does not, for example, first have to think of which operating elements have to be used for the currently activated longitudinally dynamic control system.

In view of the use of the adjusting element, the above-described further development can be implemented as a whole by a motor vehicle equipped with a steering wheel according to one of the above-described embodiments of the invention, in the case of which several longitudinally dynamic control systems are provided which can each be separated as a function of a set speed value. The operating elements arranged on the steering wheel include at least one preselection element constructed separately from the adjusting element, the actuation of the preselection element causing one of the several longitudinally dynamic control systems to be preselectable. And, in the case of which, in the event of the preselection of a first longitudinally dynamic control system, the adjusting element is used for changing the set speed value for this first control system, whereas, in the event of the preselection of a second longitudinally dynamic control system, it is used for changing the set speed value for this second control system.

In view of the use of additional operating elements, it may be particularly advantageous—if, in the case of the motor vehicle, at least two longitudinally dynamic control systems can each be operated as a function of at least one additional operating input—for the operating elements provided on the steering wheel to include at least one additional operating element constructed separately of the adjusting element and the preselection element, by which operating element, in the case of the preselection of the first longitudinally dynamic control system, at least one additional operating input concerning the first control system can be carried out. In the case of the preselection of the second longitudinally dynamic control system, by way of this additional operating element, at least one additional operating input can be carried out concerning the second control system.

For such an embodiment or further development of the invention, the operating elements arranged on the steering wheel have to include at least one additional operating element constructed separately of the adjusting element and the preselection element, for carrying out a further operating input.

In the simplest case, the inputs of the adjusting element and/or of the additional operating element each relate to all longitudinally dynamic control systems of the motor vehicle.

However, also configurations in which one of three longitudinally dynamic control systems A, B and C can be preselected by the preselection element and in which the adjusting element is used for adjusting a set speed at A and B (but not at C) while the additional operating element is used for inputs with respect to B and C (but not with respect to A) are also advantageous. Furthermore, another operating element may be backed by a function only in the case of the preselection of the longitudinally dynamic control system C. The operating logic may, for example, be designed such that a key for defining a distance from a vehicle driving ahead is backed by a function only when a longitudinally dynamic control system is preselected by the preselection element, which control system takes into account and/or influences a value of the distance from a vehicle driving ahead.

As an alternative to the above-described further development, a preselection element according to another embodiment of the invention can be used with the same advantages also for the preselection of one of several operating modes of a longitudinally dynamic control system of the motor vehicle. This embodiment is based on a consideration similar to that described above. The operation of a longitudinally dynamic control system in various operating modes implies essentially similar or partly even the same operating commands. For the input of these operating commands, the same operating elements can be used; particularly the same adjusting element constructed bidirectionally and in several steps according to the invention can be used if the operating elements arranged on the steering wheel include at least one preselection element constructed separately from the adjusting element, for the selection of one of several operating modes of the corresponding longitudinally dynamic control system.

In view of the use of the adjusting element, this alternative further development can be implemented as a whole by a motor vehicle equipped with a steering wheel according to one of the above-described embodiments, in the case of which at least one longitudinally dynamic control system of the motor vehicle can be operated in different operating modes in each case as a function of a set speed value. The operating elements include at least one preselection element constructed separately from the adjusting element. The actuation of the preselection element causes one of the several operating modes to be preselectable. In which case, in the event of the preselection of a first operating mode, the adjusting element is used for changing the set speed value for this first operating mode, whereas, in the event of the preselection of a second operating mode, it is used for changing the set speed value for this second operating mode.

In view of the use of additional operating elements, it may be particularly advantageous—if the at least one longitudinally dynamic control system provided in the case of the motor vehicle can be operated in at least two different operating modes in each case as a function of at least one additional operating input—for the operating elements provided on the steering wheel to include at least one additional operating element constructed separately of the adjusting element and the preselection element, by which operating element, in the case of the preselection of the first operating mode, at least one additional operating input concerning the first operating mode can be carried out. In the case of the preselection of the second operating mode, by use of this additional operating element, at least one additional operating input can be carried out concerning the second operating mode.

According to an advantageous embodiment of the invention, the adjusting element and the preselection element as well as, as required, another operating element according to the above description, are arranged in a spatially adjacent manner on the same side (for example, on the left side) of the steering wheel with respect to its center line. The arrangement specifically is characterized in that, on the other side with respect to the center line of the steering wheel (correspondingly, for example, on the right side), only input elements are arranged, which do not relate to a longitudinally dynamic control system of the motor vehicle. According to such an embodiment, a functional classification of the operating elements provided on the steering wheel is therefore expressed by the spatial arrangement on the steering wheel. This considerably facilitates the operation for the operator. The implementation of this idea is particularly consistent if no input elements without any connection with a longitudinally dynamic control system of the vehicle are arranged on the side on which the adjusting element and the preselection element are arranged.

The operator's orientation with respect to his interaction with display and operating elements is promoted further if the spatial arrangement of the operating elements on the steering wheel is coordinated with the spatial arrangement of the corresponding display elements. It was described above that, depending on whether there is a connection with a longitudinally dynamic control system, the operating elements can be arranged on the left or on the right side of the steering wheel. If several display surfaces which are laterally offset with respect to one another are available in the motor vehicle for emitting information concerning a longitudinally dynamic control system, it is particularly advantageous to use a display surface for this output which the operator intuitively associates spatially with the operating elements. If such a display surface is not available anyhow, it is advantageous to provide a display surface that is arranged in this manner and to use it correspondingly.

In a simple case, an instrument cluster has two circular instruments which are arranged side-by-side, each having an integrated display surface. On the left side, the steering wheel of the motor vehicle has a group of operating elements with respect to longitudinally dynamic control systems but, on the right side, has only operating elements which do not relate to longitudinally dynamic control systems. Visual displays concerning the longitudinally dynamic control systems will then expediently appear only on the display surface in the left instrument. In the case of such an embodiment of the invention, the assignment is easy for the user in many respects. When the driver operates the operating elements on the left side, he will intuitively also expect a pertaining display to be on the left side—and will also find it there in the described embodiment. When the operator finds a visual display on the display surface in the left instrument, he will intuitively try to carry out an operating action related thereto by use of operating elements on the same side.

A total implementation of the described idea therefore preferably provides that, in the case of a steering wheel for a motor vehicle, an adjusting element of the described type and a preselection element of the described type as well as, as required, additional operating elements are arranged in a spatially adjacent manner (with respect to the center line of the steering wheel) on the same side, while, on the other side, only input elements without any connection to a longitudinally dynamic control system of the motor vehicle are arranged. In the case of the motor vehicle, an instrument cluster is provided which has two display surfaces arranged on different sides with respect to the center line of the instrument cluster, in which case visual information related to longitudinally dynamic control systems of the motor vehicle is essentially (or in the case of a particularly advantageous construction even exclusively) emitted on that display surface which, with respect to the center line of the instrument cluster, is arranged on the side on which the adjusting element and the preselection element are arranged with respect to the center axis of the steering wheel.

As an alternative, an expanded operability of a longitudinally dynamic control system for a motor vehicle can be achieved when an input element is provided on the steering wheel of the motor vehicle which corresponds to the input element in accordance with the invention. The input element can be operated in two opposite actuating directions in order to predefine, as a result of the actuating direction, a direction of the change of a set speed value of the longitudinally dynamic control system, and can be actuated in several steps in at least one actuating direction with respect to the extent of the actuation in order to predefine, as a result of the extent of the actuation, at least one adjustment of the controller behavior, particularly the stiffness, of the longitudinally dynamic control system. Thus, as a function of the extent of the actuation, the controller adjustments, particularly a controller intensification of the longitudinally dynamic control system are changed. In addition, a different extent of the change of the set speed may also be assigned to the differentiable steps of the extent of the actuation. However, this does not necessarily have to be the case. For example, also in the case of two differentiable steps of the extent of the actuating, the same extent of the change of the set speed may also be assigned to both steps. However, in the case of an actuation to the extent of the first step, the controlling to the changed set speed is slow or soft, while in the case of an actuation to the extent of the second step, the controlling to the changed set speed is rapid or stiff. Thus, depending on the extent of the actuation, the driver can optionally predefine a more comfortable or a more sporty acceleration behavior or deceleration behavior of the motor vehicle.

With regard to the deceleration of the vehicle, the operating logic may particularly advantageously be constructed such that an actuation to the extent of a first step will only have the result that the motor vehicle slowly reduces its speed exclusively as a result of friction and aerodynamic drag but without an active braking intervention, whereas an actuation to the extent of a second step results in an active braking intervention of the vehicle in order to reduce the speed of the vehicle still faster than in the case of the actuation to the extent of the first step. In this case, the actuation to the extent of the second step may, but does not necessarily have to result in a reduction of the set speed which is greater with respect to its amount. If the extent of the reduction of the set speed is selected to be equal in both steps, they essentially would differ only in that an active braking intervention does not take place before the second step.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a view of a steering wheel for a motor vehicle according to a preferred embodiment of the present invention.

DETAILED DESCRIPTION OF THE DRAWING

The steering wheel 1 is equipped with operating elements 2 to 7 for controlling two different longitudinally dynamic control systems (conventional cruise control and ACC (adaptive cruise control)) of a motor vehicle. Furthermore, the steering wheel 1 has additional operating elements $8_1, 8_2, 8_3, 8_4$, 9 which, however, are not provided for operating the longitudinally dynamic control systems.

In accordance with a preferred embodiment, the steering wheel 1 has a rotary rocker 2 as an adjusting element, which is constructed to have two steps in both operating directions. By means of this rotary rocker 2, the set speed of the currently activated longitudinally dynamic control system can be adjusted in one-unit and ten-unit steps. For increasing the set speed, the rocker 2 is moved upward by the operator; for decreasing the set speed, it is moved downward.

A switch-over possibility between the two longitudinally dynamic control systems (similar to a MODE key) is provided below the rotary rocker in the form of the preselection key 3. The preselection key 3 can also be used such that its single or repeated actuation leads not only to the preselection but also to the immediate activation of the respective longitudinally dynamic control system.

Particularly advantageously, the preselection key 3 can also be constructed to be actuated such that the actuation of the key, as a function of the current preselection, results in different haptic acknowledgements to the operator. As an alternative or in addition, a status display in the instrument cluster of the motor vehicle or an indication of a head-up display can inform the driver concerning the current preselection. The immediate activation of a certain or of the last preselected longitudinally dynamic control system when actuating the rotary rocker 2 is also contemplated.

In the present case, the activation of the respectively preselected longitudinally dynamic control system can take place only by way of the ON/OFF key 7. The operating elements for the ON/OFF switching (ON/OFF, key 7), setting of a set speed (SET, Key 6) or the retrieving of the last set and stored set speed (RESUME, key 4) are arranged in a targeted manner in a separate column in the present case. An actuation of the keys 4 and 6 also relates in each case to the currently preselected longitudinally dynamic control system.

According to a particularly advantageous further development, the RESUME key 4 has a raised construction, similar to the rotary rocker 2. The operator can then orient himself in each vertical column of the operating elements 2 to 7 also in a haptic and tactile manner. Thus, an unintentional setting or activating of the preselected longitudinally dynamic system as a result of mixing up the operating elements can be effectively prevented.

A key 5 for the range adjustment for the ACC system is arranged "in front of" or above the rotary rocker 2 and, in the present case, is constructed as a key by which range steps provided in the system can be switched through by repeated pressing. The key 5 will then only be backed by this function when the ACC system is preselected by the preselection key 3.

While, among other things, the longitudinally dynamic control systems provided in the case of the motor vehicle contribute to a relaxed driving, the arrangement of the operating elements and the display elements in the motor vehicle may be aimed in a targeted manner at supporting the driver when steering the vehicle with only one hand, particularly only with the left hand, in the best possible manner. Operating acknowledgements or status acknowledgements concerning the longitudinally dynamic control systems (for example, a display of the set speed) are emitted on a display surface in the left circular instrument of the instrument cluster of the motor vehicle. In a manner coordinated therewith, the operating elements 2 to 7 for the longitudinally dynamic control systems are arranged on the left steering wheel spoke in the case of the embodiment illustrated in FIG. 1.

Consequently, the operating elements 8$_1$,8$_2$,8$_3$,8$_4$,9 for selected functions of the information and communications systems of the motor vehicle are arranged on the other steering wheel spoke. For operating a list (for example, for "scrolling" in a list), which is displayed on the right in the instrument cluster, an operating element constructed as a rotary/push knurl 9, which is arranged in a position mirror-invertedly with respect to the rotary rocker 2 for the speed adjustment. Operating elements for the switch-over between different lists may, for example, be arranged above or below the knurl 9. In a further column, suitable operating elements may be arranged for influencing the volume or for additional functions. Also during an ambitious two-hand drive, it thereby becomes possible for the driver to access, by means of his "information and communication hand" (here, his right hand), essential functions of these systems. During a relaxed drive, as an alternative, these functions can optionally be influenced with the same hand by way of corresponding operating elements (not separately indicated graphically) in the center console and/or a center stack of the motor vehicle.

In addition to the illustrated operating elements and the described functions, the steering wheel operation of the longitudinally dynamic control systems may be expanded by the operation of transversely dynamic functions. All vehicle systems having a direct feedback to the longitudinal or transverse guidance of the vehicle can then be operated directly by way of the steering wheel.

The above-indicated embodiment of the invention offers a number of advantages to the driver which do not exist in the case of systems known from the prior art. These include an unambiguous and consequent separation—implemented by the arrangement on different steering wheel spokes—between operating elements for functions directly relating to the driving task, such as driver assistance systems (for example, cruise control, ACC, etc.), and tertiary functions, such as the volume adjustment or the selection of an audio source. This also includes a direct spatial assignment or mutual coordination of operating elements and indicating elements or display surfaces. It also includes the providing of a rotary rocker as the adjusting element for set speeds, by which, in the present case alone, eight different operating commands (increasing/reducing of speed in one-unit/ten unit steps relative to two different longitudinally dynamic control systems) can be generated. Finally, this includes the expandability of the operation of driver assistance systems by an observable and haptically codable operating element for the MODE switch-over, for example, between cruise control and range control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering wheel for a motor vehicle having at least one longitudinally dynamic control system, comprising:
    a plurality of operating elements for controlling the at least one longitudinally dynamic control system of the motor vehicle;
    wherein the plurality of operating elements comprise:
        an adjusting element for changing a set speed value for the at least one longitudinally dynamic control system, the adjusting element being actuatable in two opposite actuating directions in order to predefine a direction of change of the set speed value in accordance with the actuating direction; and
        wherein the adjusting element is actuatable beyond at least two perceptible pressure points in each of the two opposite actuating directions in which an extent of actuation of the adjusting element corresponds to a predefined extent of speed change of the set speed value,
        wherein a first extent of speed change of the set speed value is associated with overcoming a first of the at least two perceptible pressure points of the adjusting element, and wherein the motor vehicle changes to a first new speed as a result of overcoming the first perceptible pressure point, where the difference between the first new speed and a speed of the motor vehicle before the first perceptible pressure point is overcome is equal to the first extent of speed change, and
        wherein a second extent of speed change of the set speed value is associated with a second of the at least two perceptible pressure points of the adjusting element, and wherein the motor vehicle changes to a second new speed as a result of overcoming the second perceptible pressure point, where the difference between the second new speed and a speed of the motor vehicle before the second perceptible pressure point is overcome is equal to the second extent of speed change.

2. The steering wheel according to claim 1, wherein different controller adjustments of the at least one longitudinally dynamic control system are assigned to the at least two perceptible pressure points.

3. The steering wheel according to claim 2, wherein different adjustments with respect to brake usage of the motor vehicle are assigned to the at least two perceptible pressure points.

4. The steering wheel according to claim 1, wherein the adjusting element is operatively configured as a rotary rocker, the rotary rocker having, in each case, a multi-step construction in two rotational directions.

5. The steering wheel according to claim 4, wherein the multi-step construction is a two-step construction.

6. The steering wheel according to claim 1, wherein the plurality of operating elements are arranged on the steering wheel, the operating elements further comprise at least one preselection element constructed separately from the adjusting element, the at least one preselection element being operatively configured to preselect one of several longitudinally dynamic control systems of the motor vehicle or one of several operating modes of the at least one longitudinally dynamic control system of the motor vehicle.

7. The steering wheel according to claim 6, wherein the operating elements further comprise at least one additional operating element for carrying out another operating input, the additional operating element being constructed separately from the adjusting element and the preselection element.

8. The steering wheel according to claim 6, wherein the adjusting element and the preselection element are arranged on the steering wheel in a spatially adjacent manner,
the adjusting element and the preselection element being arranged on a same side of the steering wheel with respect to a center line of the steering wheel, and
wherein only input elements not related to a longitudinally dynamic control system of the motor vehicle are arranged on an opposite side with respect to the center line of the steering wheel.

9. The steering wheel according to claim 1, wherein an extent of haptic feedback provided to an operator of the motor vehicle corresponds to the extent of actuation of the adjusting element.

10. A motor vehicle, comprising:
at least one longitudinally dynamic control system;
a steering wheel having a plurality of operating elements for controlling the at least one longitudinally dynamic control system;
wherein the plurality of operating elements comprise:
an adjusting element for changing a set speed value for the at least one longitudinally dynamic control system, the adjusting element being actuatable in two opposite actuating directions in order to predefine a direction of change of the set speed value in accordance with the actuating direction; and
wherein the adjusting element is actuatable beyond at least two perceptible pressure points in each of the two opposite actuating directions in which an extent of actuation of the adjusting element corresponds to a predefined extent of speed change of the set speed value,
wherein a first extent of speed change of the set speed value is associated with overcoming a first of the at least two perceptible pressure points of the adjusting element, and wherein the motor vehicle changes to a first new speed as a result of overcoming the first perceptible pressure point, where the difference between the first new speed and a speed of the motor vehicle before the first perceptible pressure point is overcome is equal to the first extent of speed change, and
wherein a second extent of speed change of the set speed value is associated with overcoming a second of the at least two perceptible pressure points of the adjusting element, and wherein the motor vehicle changes to a second new speed as a result of overcoming the second perceptible pressure point, where the difference between the second new speed and a speed of the motor vehicle the second perceptible pressure point is overcome is equal to the second extent of speed change.

11. The motor vehicle according to claim 10, wherein several longitudinally dynamic control systems are operatively configured in the motor vehicle, each being operable as a function of the set speed value; and
wherein the operating elements further comprise at least one preselection element constructed separately from the adjusting element, actuation of the preselection element preselecting one of the several longitudinally dynamic control systems;
wherein, in the event of a preselection of a first longitudinally dynamic control system, the adjusting element is used for changing the set speed value for this first control system; and
wherein, in the event of a preselection of a second longitudinally dynamic control system, the adjusting element is used for changing the set speed value for the second control system.

12. The motor vehicle according to claim 11, wherein at least two longitudinally dynamic control systems are operable as a function of at least one additional operating input; and
wherein the operating elements further comprise at least one additional operating element constructed separately from the adjusting element and the preselection element, by which, in an event of a preselection of the first control system, the at least one additional operating input concerning the first control system is carried out, and in an event of the preselection of the second control system, the at least one additional operating input concerning the second control system is carried out.

13. The motor vehicle according to claim 10, wherein the at least one longitudinally dynamic control system of the motor vehicle is operable in several different operating modes, in each case as a function of the set speed value,
wherein the operating elements further comprise at least one preselection element constructed separately from the adjusting element, by whose actuation one of the several operating modes is preselectable; and
wherein, in an event of the preselection of a first operating mode, the adjusting element is used for changing the set speed value for the first operating mode; and
wherein, in an event of the preselection of a second operating mode, the adjusting element is used for changing the set speed value for the second operating mode.

14. The motor vehicle according to claim 13, wherein the at least one longitudinally dynamic control system is operable in at least two different operating modes in each case as a function of at least one additional operating input; and
wherein the operating elements further comprise at least one additional operating element constructed separately from the adjusting element and the preselection element, by which, in an event of the preselection of the first operating mode, the at least one additional operating input is carried out concerning the first operating mode, and, in an event of the preselection of the second operating mode, the at least one additional operating input is carried out concerning the second operating mode.

15. The motor vehicle according to claim 10, further comprising:
an instrument cluster having two display surfaces, one display surface being arranged on one side with respect to a center line of the instrument cluster and the other display surface being arranged on an opposite side;
wherein the operating elements further comprise at least one preselection element, constructed separately from the adjusting element, for preselecting one of several longitudinally dynamic control systems of the motor vehicle or one of several operating modes of the at least one longitudinally dynamic control system of the motor vehicle; and
wherein visual information relating to the at least one longitudinally dynamic control system is provided on the display surface that is arranged on a same side with respect to the center line of the instrument cluster on which the adjusting element and the preselection element are arranged with respect to the center line of the steering wheel.

16. The motor vehicle according to claim 10, wherein an extent of haptic feedback provided to an operator of the motor vehicle corresponds to the extent of actuation of the adjusting element.

17. A method of operating a longitudinally dynamic control system of a motor vehicle, the method comprising the acts of:
operating an adjusting element arranged on a steering wheel of the motor vehicle in order to operate the longitudinally dynamic control system;
wherein the adjusting element is actuatable in two opposite actuating directions in order to predefine a direction of change of a set speed value based on the actuating direction; and
wherein the adjusting element is further actuatable beyond at least two perceptible pressure points in each of the two actuating directions in which an extent of actuation of the adjusting element corresponds to a predefined extent of speed change of the set speed value,
wherein a first extent of speed change of the set speed value is associated with overcoming a first of the at least two perceptible pressure points of the adjusting element, and wherein the motor vehicle changes to a first new speed as a result of overcoming the first perceptible pressure point, where the difference between the first new speed and a speed of the motor vehicle before the first perceptible pressure point is overcome is equal to the first extent of speed change, and
wherein a second extent of speed change of the set speed value is associated with a second of the at least two perceptible pressure points of the adjusting element, and wherein the motor vehicle changes to a second new speed as a result of overcoming the second perceptible pressure point, where the difference between the second new speed and a speed of the motor vehicle before the second perceptible pressure point is overcome is equal to the second extent of speed change.

18. The method according to claim 17, wherein different controller adjustments of the longitudinally dynamic control system are assigned to the at least two perceptible pressure points.

19. The method according to claim 17, further comprising the act of:
preselecting one of several longitudinally dynamic control systems of the motor vehicle or one of several operating modes of the longitudinally dynamic control system of the motor vehicle via a preselection element arranged on the steering wheel separate from the adjusting element.

20. The method according to claim 17, wherein an extent of haptic feedback provided to an operator of the motor vehicle corresponds to the extent of actuation of the adjusting element.

* * * * *